Patented July 29, 1952

2,605,263

UNITED STATES PATENT OFFICE 2,605,263

PREPARATION OF PIPERAZINE

Martin J. Culver, Philadelphia, Pa., and Louis H. Bock, Shelton, Wash., assignors to Rohm & Haas Company, Philadelphia, Pa., a corporation of Delaware No Drawing. Application December 16, 1949, Serial No. 133,476

8 Claims. (Cl. 260—268)

This invention concerns a method for preparing piperazine. It deals with a process wherein di(cyanomethyl)amine, available from the reaction of common raw materials, formaldehyde, ammonia, and hydrogen cyanide, is hydrogenated in the presence of an acid-treated nickel or cobalt hydrogenation catalyst.

It has been shown that the hydrogenation of glutarodinitrile in the presence of a nickel catalyst at 80–100 atmospheres pressure and at about 100° C. gave a 20% to 25% yield of piperidine. When this reaction was attempted with di(cyanomethyl)amine, however, only resins were obtained.

We have now found that di(cyanomethyl)-amine can be hydrogenated in the presence of an acid-treated nickel or cobalt catalyst to give fair yields of piperazine. The di(cyanomethyl)-amine is dissolved in an organic solvent, such as ethyl alcohol, dioxane, or the like. To the solution, is added acid-treated nickel or cobalt catalyst in an amount from about 50% to 200% of the weight of the di(cyanomethyl)amine. Hydrogen is run in under pressure and the reaction mixture is heated. Temperatures between 40° C. and 250° C. and pressures between 50 and 500 atmospheres or more are generally suitable for carrying out the desired reactions. The product is isolated through distillation and crystallization.

In preparation of the catalyst there is taken an active form of nickel or cobalt, such as prepared by the method of Raney. The metal catalysts as thus prepared are stored under water or an organic solvent such as ethyl alcohol, dioxane, or other liquid. The wet catalyst is treated with a water-soluble, strong organic acid, such as acetic, propionic, oxalic, glycolic, succinic, or other carboxylic acid composed of only carbon, hydrogen, and oxygen. The thick paste of catalyst as commercially available may be thinned with water or water-miscible solvent and the paste stirred with acid at room temperatures. Only enough acid need be added to reduce the pH of the catalyst suspension definitely below 7. The slurry is brought into the range of pH from 4 to 7 and preferably to a pH between 5.5 and 6.5. The catalyst is allowed to settle and the supernatant liquor decanted off. The catalyst may be washed but this is not essential.

Additional details of preparing piperazine are given in the following illustrative examples.

Example 1

A portion of 100 grams of commercially available Raney nickel in paste form was diluted with 100 grams of water. While the resulting suspension was stirred, acetic acid was slowly added until the slurry was found to have a pH of 6.5. The suspension was allowed to stand for a half-hour. The liquid was poured off and the metal paste was ready for use.

A solution of 47.5 grams of di(cyanomethyl)-amine was made in 200 ml. of 95% ethyl alcohol. This solution and 55 grams of the acid-treated nickel catalyst were placed in a bomb. Hydrogen was admitted thereto and the bomb was heated for two hours at 40° to 63° C. and then at 180° C. for 5.5 hours. The hydrogen pressure was carried to 120 atmospheres. The bomb was then cooled, pressure was released, and the catalyst separated by filtration. The liquid was fractionally distilled through a packed column. The fraction taken at 115° to 142° C., amounting to 42 grams, contained the desired product. This was redistilled. There was thus obtained a portion of 12 grams which gave the correct analysis for piperazine. This product melted at 104° C.

Example 2

The procedure of Example 1 was followed with the hydrogen pressure at 3500 lbs. per square inch and the temperature held at 58°–59° C. for three hours and at 215° C. for 15 hours. Distillation was carried out as above. The yield of crystalline product was 30% of theory. It was identified as piperazine.

Example 3

Raney nickel paste was diluted with about an equal volume of water. A saturated solution of oxalic acid was added while the suspension was stirred. After the suspension was found to have a pH of 6.3, addition of acid was discontinued and the catalyst was allowed to settle. The liquid was drawn off and the catalyst washed with distilled water.

The catalyst was then added to di(cyanomethyl)amine as in the above examples, a portion of 45 grams being used for 47 grams of the amine. The charge was heated for 2.5 hours at 50°–60° C. and for four hours at 180° C. under 4000 lbs. hydrogen pressure. The product was worked up as in previous examples. Piperazine was obtained in a 29% yield.

Example 4

The procedure of Examples 1 and 2 was followed with the substitution of 55 grams of Raney cobalt paste which was treated with acetic acid by the method described in Example 1. Heating was carried on at 62° C. for three hours and at 180° C. for five hours. The yield of piperazine was 27.6%.

Active cobalt or nickel may be treated as above with other water-soluble, carboxylic acids than those used above with the same effect. The saturated aliphatic acids are particularly desirable, being economical and effective. Other carboxylic acids, both monobasic and polybasic, can be used. Where traces of acid might appear deleterious, the acid-treated catalysts can be rinsed.

The method here-disclosed gives fair yields of piperazine from di(cyanomethyl)amine by hydrogenation in the presence of acid-treated nickel or cobalt metal catalysts. The method thus permits use of an intermediate which can be prepared from relatively cheap materials to give a cyclic diamine which is an important intermediate for the preparation of materials in the fields of textile, dye, and medicinal chemicals.

We claim:

1. A process for preparing piperazine which comprises hydrogenating di(cyanomethyl)amine under pressure in the presence of an acid-treated active metal catalyst from the class consisting of nickel and cobalt, the acid used for treating catalyst being an organic, water-soluble acid composed of only carbon, hydrogen, and oxygen, an aqueous suspension of said catalyst having a pH below 7.

2. A process for preparing piperazine which comprises reacting di(cyanomethyl)amine with hydrogen under pressure in the presence of an active metal catalyst which is selected from the class consisting of nickel and cobalt and which has been treated in suspension with a water-soluble organic acid composed of only carbon, hydrogen, and oxygen in an amount sufficient to adjust an aqueous slurry of said catalyst to a pH between 4 and 7.

3. A process for preparing piperazine which comprises reacting di(cyanomethyl)amine with hydrogen under pressure at temperatures between 40° C. and 250° C. in the presence of an active metal catalyst selected from the class consisting of nickel and cobalt, said catalyst having been treated in aqueous suspension with a water-soluble organic acid composed of only carbon, hydrogen, and oxygen in an amount sufficient to adjust an aqueous slurry of said catalyst to a pH between 4 and 7.

4. A process for preparing piperazine which comprises reacting di(cyanomethyl)amine with hydrogen under pressure at temperatures between 40° C and 250° C. in the presence of Raney nickel catalyst which has been treated with a water-soluble organic acid composed of only carbon, hydrogen, and oxygen in an amount sufficient to adjust an aqueous slurry of said catalyst to a pH between 4 and 7.

5. A process for preparing piperazine which comprises reacting di(cyanomethyl)amine with hydrogen under pressure at temperatures between 40° C. and 250° C. in the presence of Raney cobalt catalyst which has been treated with a water-soluble organic acid composed of only carbon, hydrogen, and oxygen in an amount sufficient to adjust an aqueous slurry of said catalyst to a pH between 4 and 7.

6. The process for preparing piperazine which comprises reacting di(cyanomethyl)amine with hydrogen under pressure at temperatures between 40° C. and 250° C. in the presence of Raney nickel catalyst which has been treated with acetic acid in an amount sufficient to impart to an aqueous slurry of said catalyst a pH of 5.5 to 6.5.

7. The process for preparing piperazine which comprises reacting di(cyanomethyl)amine with hydrogen under pressure at temperatures between 40° C. and 250° C. in the presence of Raney cobalt catalyst which has been treated with acetic acid and which in an aqueous slurry gives a pH below 7.

8. A process for preparing piperazine which comprises reacting di(cyanomethyl)amine with hydrogen under pressure at temperatures between 40° C. and 250° C. in the presence of an active metal catalyst from the class consisting of nickel and cobalt, said catalyst having been treated with acetic acid in an amount sufficient to impart to an aqueous slurry of said catalyst a pH of 5.5 to 6.5.

MARTIN J. CULVER.
LOUIS H. BOCK.

REFERENCES CITED

The following references are of record in the file of this patent:

UNITED STATES PATENTS

| Number | Name | Date |
| --- | --- | --- |
| 2,267,686 | Kyrides | Dec. 23, 1941 |

OTHER REFERENCES

Richter: Textbook of Organic Chemistry, p. 217 (1938 edition), John Wiley and Sons, Inc., New York, N. Y.